United States Patent [19]
Adembri et al.

[11] Patent Number: 5,596,021
[45] Date of Patent: Jan. 21, 1997

[54] CROSSLINKABLE POLYESTER/ISOCYANATE COMPOSITIONS SUITABLE FOR PREPARING COMPOSITE MANUFACTURED ARTICLES, IN PARTICULAR BY MEANS OF INJECTION PROCESSES, PROCESS FOR PREPARING THEM AND THEIR USE

[75] Inventors: Andrea Adembri, Florence; Lino Credali, Bologna; Giovanni Di Drusco, Ferrara, all of Italy

[73] Assignee: Sir Industriale S.p.A., Italy

[21] Appl. No.: 306,526

[22] Filed: Sep. 15, 1994

Related U.S. Application Data

[63] Continuation of Ser. No. 63,929, May 18, 1993, abandoned.

[30] Foreign Application Priority Data

May 20, 1992 [IT] Italy ................... MI92A1223

[51] Int. Cl.$^6$ ............. C08G 18/02; C08G 18/67; C08F 283/00; C08L 79/04
[52] U.S. Cl. ............. 521/99; 521/108; 521/110; 521/112; 521/123; 521/126; 521/131; 521/172; 521/173; 525/28; 528/73; 528/75
[58] Field of Search ............. 521/99, 108, 110, 521/112, 123, 126, 131, 172, 173; 525/28; 528/73, 75

[56] References Cited

U.S. PATENT DOCUMENTS

| | | | |
|---|---|---|---|
| 4,386,166 | 5/1983 | Peterson et al. | 521/99 |
| 4,581,384 | 4/1986 | Marion | 521/110 |

FOREIGN PATENT DOCUMENTS

| | | |
|---|---|---|
| 0391668A3 | 10/1990 | European Pat. Off. . |
| 0441416 | 8/1991 | European Pat. Off. . |
| 0444956A3 | 9/1991 | European Pat. Off. . |
| 0445837 | 9/1991 | European Pat. Off. . |

OTHER PUBLICATIONS

Patent Abstracts of Japan, vol. 10, No. 390, Dec. 26, 1986 (English Abstract of Japanese Patene No. 61–176623).
Cellular Polymers, vol. 10, No. 3, 1991, K. C. Frisch et al. "Hybrid IPN Foam composites".
H. L. Frisch, D. Lempner, K. C. Frisch, J. Polym. Sci., Polym. Letters, 7:775, 1969.
K. C. Frisch, H. L. Frisch, D. Klempner, S. K. Mukherjee, J. Appl. Polym. Sci., 18:689, 1974.
K. C. Frisch, D. Kempner, Advances in interpenetrating polymer Networks, vol. II, 1–46, 1990.

*Primary Examiner*—Frederick Krass
*Attorney, Agent, or Firm*—Bryan Cave LLP

[57] ABSTRACT

The present invention relates to a crosslinkable polyester/isocyanate composition suitable for preparing composite manufactured articles endowed with high structural mechanical properties, by means of injection processes, comprising:

A—a polyfunctional isocyanate;
B—an unsaturated polyester resin, or a vinyl ester resin, or a mixture of both said resins, wherein said resin can contain free hydroxy groups;
C—a free-radical polymerization initiator;
D—a promoter of decomposition of (C) initiator;
E—a catalyst of (A) isocyanate trimerization.

17 Claims, No Drawings

CROSSLINKABLE POLYESTER/ISOCYANATE COMPOSITIONS SUITABLE FOR PREPARING COMPOSITE MANUFACTURED ARTICLES, IN PARTICULAR BY MEANS OF INJECTION PROCESSES, PROCESS FOR PREPARING THEM AND THEIR USE

This is a continuation of U.S. application Ser. No. 08/063,929, filed May 18, 1993, now abandoned.

The present invention relates to compositions consisting of two reactive systems capable of independently undergoing polymerization, generating interpenetrated or semiinterpenetrated structures with a certain degree of mutual grafting.

In these compositions, one of said reactive systems consists of an unsaturated polyester or vinyl ester resin, capable of reacting in the presence of a free-radical initiator with a vinylic monomer, to form a threedimensional crosslinked structure.

The second system consists of at least one isocyanate and, optionally, a polyol, and is such as to be capable of forming structures substantially constituted of isocyanurates in the presence of a suitable catalyst, thus generating a second threedimensional structure interpenetrated with the first one. In the presence of particular components, such as, e.g., hydroxy group containing resins, the above said interpenetrated polymeric structures can display mutual grafting points.

Compositions based on unsaturated polyesters and isocyanates have been disclosed in U.S. Pat. Nos. 4,386,166 and 4,581,384, and, furthermore, in European patent applications EP-0 441 416 and EP-0 445 837. In all of the cases taken into consideration in said prior art, the products are unsuitable for preparing reinforced structural components by means of injection of the resin (of RTM type), or of compression moulding fabrication processes.

The purpose of the present invention is of providing a low-cost thermosetting system characterized by short moulding cycles (shorter than 5 minutes with no need for posthardening), a good mechanical behaviour and good resistance to the attack by the environmental agents with regard to manufactured articles. More particularly, the subject-matter of the present invention relates to crosslinked compositions suitable for producing composite manufactured articles by injection of resin in a closed mould, said compositions being constituted by two separate blends (I) and (II), which are mixed with each other at the time of injection into the mould (RIM, R-RIM and S-RIM processes), and are capable of rapidly reacting inside said mould, forming the finished piece.

The compositions according to the present invention comprise the following components:

(A) an isocyanate, or an isocyanic prepolymer having a functionality of at least 2 and not higher than 5, preferably of from 2 to 4, and a viscosity comprised between 20 and 10,000 cP, preferably between 40 and 1,000 cP;

(B) an unsaturated polyester resin or a vinyl ester resin, containing unsaturations of vinylic or vinylidenic type, blended with 10–60% by weight of a vinylic or divinylic monomer, in a total amount comprised between 10 and 80% by weight, relatively to the total weight of (A) and (B), said resin preferably containing end-chain or pendant hydroxy groups;

(C) a free-radical polymerization initiator stable at temperatures lower than 70° C., in an amount comprised between 0.1 and 4% of the total weight of (A) and (B) components;

(D) a promoter for the decomposition of (C) initiator at temperatures lower than 70° C., constituted by a transition metal salt, preferably Co(II) and Mn(III), soluble in the mixture of (A) and (B) components, in an amount, as calculated by the metal, between 0.005 and 0.5% by weight, relatively to the weight of (A)+(B), or constituted by an N,N-dialkyl substituted aromatic amine in an amount comprised between 0.05 and 1% by weight; and (E) a catalyst of (A) isocyanate trimerisation, in an amount comprised between 0.01 and 1% by weight, relatively to the total weight of (A) and (B) components.

Such compositions, differently from those known from the prior art, result in being particularly suitable in high-throughput industrial applications, such as the preparation of structural components by means of resin injection or compression moulding fabrication processes.

The compositions according to the present invention are characterized by a high stability of both separated blends, which make it possible for them to be stored and handled over long periods, and by a high reactivity or crosslinking rate, after an adjustable induction period, such as to render feasible the rapid moulding technologies when both blends are mixed with each other. It is the latter feature of the compositions according to the present invention that in particular allows the advantage of the high-throughput production of components of composite material, for example, in automotive industry.

The materials obtained from the compositions according to the present invention display a low moulding shrinkage value during the crosslinking reaction, high mechanical properties, better self-extinguishing and flame retardant characteristics than from systems based on traditional polyesters. On the other hand, as compared to essentially polyurethane based systems, the above said materials display a lower cost and are more easily processed as a consequence of the existance of a predetermined induction time before the crosslinking reaction.

To the (B) component of the composition according to the present invention, a small amount of a polyol is added with a functionality of at least 2 and not higher than 7, preferably comprised between 2 and 5, having a molecular weight of at least 200 and lower than 10,000, preferably of from 300 to 5,000. Both in the absence, and in the presence, of polyol, the molar ratio of isocyanate/hydroxy groups, of the isocyanate of the (A) component to the total amount of the hydroxy groups of the (B) component, is higher than 1.5 and is preferably comprised between 2.5 and 6.

In order to increase the heat resistance and the impact resistance of the manufactured articles obtained from the compositions according to the present invention, said compositions preferably comprises an epoxy modifier [(F) component], capable of reacting with the (A) component in the presence of the (E) catalyst.

In the compositions according to the present invention, a foaming agent may also be included, for example, of the type used for polyurethanic resin, when reinforced foamed manufactured articles have to be produced by means of a short moulding cycle process. Furthermore, to the compositions according to the present invention, also mineral fillers may be added.

Thanks to the high value of the isocyanate/hydroxy ratio used in the composition according to the present invention, the use of (E) component causes a polymeric structure substantially of isocyanurate type to be formed with a high content of the following units

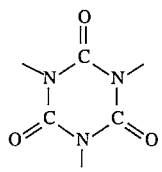

in a crosslinked structure, completely interpenetrated in the polyester- or vinyl ester based crosslinked structure. The concept of interpenetrated structure is well known in the art, and is described by K. C. Frisch (H. L. Frisch, D. Klempner, K. C. Frisch—J. Polym. Sci., Polym. Letters, 7:775, 1969; K. C. Frisch, H. L. Frisch, D. Klempner, S. K. Mukherjee—J. Appl. Polym. Sci., 18:689, 1974; K. C. Frisch, D. Klempner—Advances in Interpenetrating Polymer Networks, vol. II, 1–46, 1990).

The present Applicant surprisingly found that the particular polymeric structure derived from the composition according to the present invention makes it possible materials to be obtained which are characterized by an extremely high heat resistance, as expressed as high values of resin glass transition temperature and distortion temperature, and retention of the mechanical properties even after long periods of exposure to high temperatures. Such an interpenetrated structure furthermore displays unusual characteristics of fire resistance, considerably higher than of the polyester-based systems.

The isocyanates of the (A) component are those comprising one of the following classes:

(I) Isocyanates of general formula:

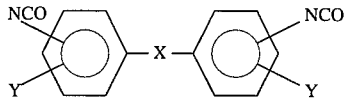

wherein:

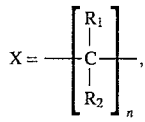

or —SO$_2$—, —CO—, —S—, —O—

R$_1$, R$_2$, which may the same or different from each other, can be H, or alkyl of from 1 to 5 carbon atoms;

n=a number comprised between 0 and 4;

Y, Y', which may be the same or different from each other, can be F, Cl, Br, H or —CH$_3$.

(II) Isocyanates of general formula:

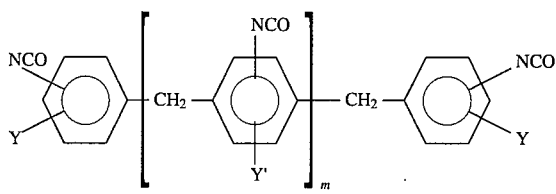

wherein:

Y, Y', Y", which may be the same or different from one another, can be H, Cl, Br, F or —CH$_3$;

m=0, 1 or 2.

Typical isocyanates of this class, with Y, Y', Y"=H, are produced by the company Mobay under the trade names MONDUR MR or DESMODUR;

(III) Isocyanates of general formula:

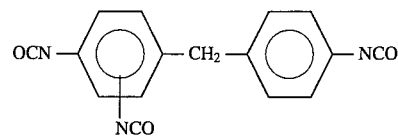

(IV) Isocyanates of general formula:

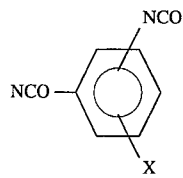

wherein:

X=H, F, Cl, Br or —CH$_3$, and the two —NCO moieties are not in 1,2-position relatively to each other, as well as the following isocyanates:

2,5-toluenediisocyanate 2,6-toluenediisocyanate 1,4-toluenediisocyanate 1,5-naphthalenediisocyanate 1,6-naphthalenediisocyanate 2,6-naphthalenediisocyanate tris(isocyanatophenyl)methane isophoronediisocyanate cyclohexanediisocyanate methylene-bis(4-cyclohexyldiisocyanate)

MDI (methylenediphenyldiisocyanate) modified with carbodiimide, for example of the type known as Isonate 143L, from Dow Chemicals;

the prepolymers obtained by means of the condensation of the isocyanates mentioned up to here with the above defined polyols.

The isocyanates of class (II) are preferred.

The unsaturated polyester polymers which form the (B) component are polyester blends with vinyl or divinyl monomers, in which the polymeric fraction derives from the esterification of dicarboxy acids or their anhydrides with glycols of various kinds, in which at least a fraction of the dicarboxylic acid or of glycol, or of both, contains unsaturation of ethylenic type.

As examples of such polymers, those may be cited which are obtained by means of the esterification of maleic anhydride, fumaric acid, itaconic acid, their mixtures, optionally in combination with other aliphatic dicarboxy acids, aromatic dicarboxy acid, such as phthalic acids (ortho-, iso-, terephthalic acid) or their anhydrides, with ethylene glycol, propylene glycol, diethylene glycol, dipropylene glycol, polyethylene glycol, 1,4-butylene glycol.

The unsaturated polyesters preferably have a low viscosity, in order to allow short moulding cycles and lower moulding pressure to be used; operating with such types of polyesters, the amount of vinylic monomer can be kept small, with self-explanatory benefits in terms of mechanical properties, percent shrinkage and reinforcer wetting ability.

The unsaturated polyesters are preferably terminated with hydroxy groups, by carrying out the polycondensation step in the presence of an excess of glycol.

On the other hand, if the amount of the grafting points between the interpenetrated structures is to be limited, the unsaturated polyesters can be terminated with functional groups which are inert to isocyanates. In that case, monofunctional alcohols or acids are added to the reaction mixture, which block the resin molecules growth, yielding a polymer having a controlled molecular weight and inert towards the other components of the reacting system.

The vinyl ester resins which optionally constitute the (B) component are all of the usual vinyl ester resins available on the market, and in particular those which can be obtained by means of the condensation of derivatives of epoxydated bisphenols A, F and S with acrylate monomers of acrylic acid, methacrylic acid type, and so forth.

The vinylic monomers which may be present in the (B) component comprise the vinylic esters, such as vinyl acetate and alkyl acrylates and methacrylates (with the alkyl radical containing from 1 to 20, and preferably from 1 to 10 carbon atoms), such as methyl acrylate, ethyl acrylate, n- and isopropyl acrylate, n-, iso- and tert-butyl acrylate, as well as the aryl, alkaryl, aralkyl, cycloalkyl acrylates, and the corresponding methacrylates.

Such vinylic monomers may furthermore comprise vinyl aromatic compounds, such as styrene and its alkyl derivatives such as alpha-methylstyrene and vinyltoluene, as well as vinylic nitriles, such as acrylonitrile and methacrylonitrile and their derivatives. Divinylic monomers falling within the scope of the (B) component are, for example, alkylene glycol dimethylacrylates, divinylphthalate and diallylphthalate.

As polyols optionally included within the scope of the (B) component and which may be used in the compositions according to the present invention, there may be mentioned for exemplifying purposes, the derivatives from the condensation of alkylene oxides, such as, e.g., ethylene oxide and propylene oxide, oxide, 1,2-butene oxide, epichlorohydrin, and so forth, with low molecular weight polyols, either of aliphatic character, such as ethylene glycol, propylene glycol, butylene glycol, glycerol, trimethylolpropane, pentaerythritol, diethanol thioether, cyclohexanediol, and the like; or of aromatic character, such as hydroquinone, resorcinol, bisphenol A, and so forth. Examples of such polyols are polyethylene glycol and polypropylene glycol. Furthermore, among such polyols, those saturated polyesterpolyols may be included, which can be obtained by causing carboxylic acid, such as terephthalic acid, isophthalic acid, succinic acid and adipic acid, or their mixtures, to react with the above said glycols or their higher homologues. The polyols deriving from the condensation with alkylene oxides, in particular polypropyleneglycol, the polyesterpolyols and polyetheresterpolyols are among the preferred polyols. The polyol is present in an amount of 0 to 3 percent by weight of the unsaturated polyester resin and/or vinyl ester resin, where the total amount of polyol in the crosslinkable polymeric composition does not exceed 3 percent by weight of the unsaturated polyester resin and/or vinyl ester resin.

As free radical polymerization initiators (the (C) component), for exemplifying purposes there may be cited here the organic peroxides, such as the alkyl esters of peroxycarboxylic acids in which the alkyl radical contains from 1 to 20, but, preferably, from 1 to 5 carbon atoms, and preferably is t-butyl, n-butyl and t-amyl; and furthermore the azo compounds, for example, azobis(isobutyronitrile) and 2,2'-azobis(2,4-dimethylvaleronitrile). Preferred initiators are t-butyl and t-amyl perbenzoate and peracetate, and dibutyl diperoxy phthalate.

As promoters of free radical initiator decomposition [the (D) component], the organic salts of transition metals, such as Mn(II) and Co(II), and copper salts soluble in the (B) resins, in particular, acetylacetonates, carboxylates, and alkanoates of said metals, and in particular their naphthenates, octanoates, hexanoates and decanoates, can be mentioned. Such salts are preferably used as a solution in plasticizers or in fluids which are reactive with at least one of the isocyanate [the (A) component] and the polyol added to the (B) component, such as, for instance, a glycol, an unsaturated fatty acid or an ester thereof, or the like.

As decomposition promoters, furthermore, those aromatic tertiary amines which are commonly used for that purpose in free-radical polymerization processes may be mentioned, among which, for exemplifying purposes, dialkylanilines, such as diethylaniline and N-(3-ethylcyclohex-2-enyl)aniline. Preferred promoters in the process according to the present invention are cobalt salts, examples of which are cobalt octanoates and neodecanoates, as well as diethylaniline.

As trimerisation catalysts [the (E) component], the aliphatic tertiary amines are cited, such as N,N,N',N'',N''-pentamethyldiethylenetriamine, N-(2-hydroxyethyl)-N,N', N'-trimethylethylenediamine, tetramethylethylenediamine, N,N,N',N'-tetramethyl-1,3-propanediamine, aminoalkyltriazines, such as 2,4,6-tris(dimethylaminopropyl)triazine; the carboxylates of quaternary ammonium salts such as, e.g., N,N,N-trimethyl-N-(2-hydroxy)propylammonium 2-ethylhexanoate; the carboxylates of metals of Groups I and II, such as potassium and sodium acetate, potassium octanoate, potassium 2-ethylhexanoate, and of transition metals, such as lead acetate and lead stearate; the catalysts prepared in situ by starting from tertiary amines and epoxy derivatives (epoxy resins, phenylglycidylether), or aziridinic derivatives, and furthermore the aminoalkylphenols, such as tris-(dimethylaminomethyl)phenol and bis(dimethylaminomethyl)phenol and, finally, 1,3-diazobicyclo[4,5,0]undec-2-ene, 1,3-diazobicyclo [3,4,0]non-2-ene, or their mixtures. Particularly suitable are the catalysts which contain N-dialkyl derivatives of glycine salified with alkaline metals, a typical example of which is sodium N-(2-hydroxy-5-nonylphenyl)methyl-N-methylglycinate, the preparation of which is reported in U.S. Pat. No. 3,896,052, optionally in mixture with other trimerisation catalysts, as mentioned hereinabove.

The optional epoxy modifier (F) may be of the type of reactive diluents used in the formulation of the epoxy resins in order to decrease the viscosity of the systems. The products used in the present invention are preferably derived from straight-chain $C_4$-$C_{16}$ alcohols, obtained by means of terminal mono- or diepoxidation with glycidyl ether, or can be terminal, straight-chain mono- or diepoxides. These epoxy modifiers result in being very effective in order to increase the impact strength of the material, thanks to the particularly favourable configuration which their chain may take inside the interior of the crosslinked resin: in fact, the situation which so arises involves the existence of a very rigid core, constituted by the ring generated by the reaction between the isocyanate and the epoxy group, around which an extremely flexible elastomeric chain is wound.

The compositions according to the present invention can be simply prepared by mixing all of the ingredients, in such a way as to obtain a rapid crosslinking. The components are preferably grouped as two blends (I) and (II). The blend (I) comprises the (B), (D), (E) components; the blend (II) comprises the (A), (C), and possibly the (F) component. Said blends (I) and (II), which can be submitted to long term storage with no problems of performance decay, can be reacted within a wide temperature range of from 10° C. to 150° C., in relation to the selected catalyst type.

The compositions according to the present invention display gelation times which can be regulated within a wide range. As known, the behaviour of viscosity with time constitutes a basic element for the preparation of composites with a high concentration of reinforcer material. The viscosity should be very low during the mould filling, so as to have a good wettability of the reinforcer material; in other words, the gel time of the resin must be longer than the mould filling time. On the other hand, if one wishes to have a high production throughput, it is necessary that the crosslinking reaction, once started, is as fast as possible.

The compositions according to the present invention allow a behaviour of the polymeric system to be obtained which is characterized by a long enough and anyway regulatable induction time, in order to achieve a good impregnation of the reinforcer material, followed by an extremely rapid crosslinking, due to a series of exothermic reactions which are autocatalyzed owing to the effect of the developed heat. Therefore, very important is the selection and fine tuning of the type and of the amount of catalysts [i.e. of the (C), (D) and (E) components] present in the same compositions.

Preferred catalytic systems are, for example, those which comprise one of the following combinations of the (C), (D) and (E) components, the amount of which is reported in the following, as weight percent, relatively to the weight of the total composition:

S1. (C) 0.5–3% by weight of peroxy compounds, of the following types:

t-butyl perbenzoate t-amyl perbenzoate t-butyl peroxyacetate di-n-butyl diperoxyphthalate, or a combination of the above said peroxy compounds, in a total amount comprised within the range of from 0.5 to 3%;

(D) 0.02–0.3% by weight of cobalt neodecanoate;

(E) 0.01–0.6% by weight of 2,4,6-tris(dimethylaminomethyl)-phenol and 0.01–0.6% by weight of a mixture of glycols and amines marketed by AIR PRODUCTS under the trade name Curithane 97.

S2. (C) 0.5–3% by weight of a peroxy compound, as indicated in the S1 catalytic system, (C) component;

(D) 0.01–0.3% by weight of cobalt(II) 2-ethylhexanoate;

(E) 0.01–0.05% by weight of the first compound reported as the (E) component of the S1 catalytic system, and 0.01–0.5% by weight of the second product reported as the (E) component of the S1 catalytic system.

The components of the above said catalytic systems can be used as such or, if one wishes to facilitate their dispersion in the resin, as a solution using a reactive solvent such as, for example, a diol or a non-reactive solvent such as a plasticizer.

The compositions according to the present invention are particularly suitable for use in RTM, RIM, R-RIM and S-RIM processes.

In the RTM processes, the compositions according to the present invention can be used by mixing both blends (I) and (II) before the injection, according to well known methods for double-component systems. In this case, the gel time must be long enough in order to allow subsequent injection and impregnation of the reinforcer fibres to be carried out. Suitable gel times are of the order of from 1 to 20 minutes. In the case of RTM, RIM, R-RIM and S-RIM technologies in which said blends (I) and (II) should be mixed at injection time, the gel times should be limited to the time necessary in order to fill the mould and allow the fibre to be impregnated. In this case, the gel times may range from approximately 10 seconds up to about 2 minutes.

The crosslinking rate can be controlled as desired and normally is made extremely high, to allow high production throughput. In general, for RTM, RIM, R-RIM and S-RIM, crosslinking times of the order of from 1 minute to 5 minutes can be provided, without detecting any residual reaction heat in a DSC (Differential Scanning Calorimetry) analysis.

The moulding temperature can be selected from a wide range relative to the type of process. For RTM, RIM and S-RIM technologies, preferred temperatures are of the order of 60°–140° C.

The viscosity of the resins according to the present invention usually is very low, thus making high injection rates possible and a good impregnation of the reinforcing material to be obtained. The typical viscosity of blends (I) and (II) can vary between 80 cP and 3,000 cP and preferably is between 100 cP and 500 cP at 25° C.

The compositions according to the present invention can be used in order to prepare composite materials by means of the usual technologies known in the art, such as compression moulding, RTM, RIM, R-RIM and S-RIM. As reinforcer fibres, organic and/or inorganic fibres (polyamides, polyesters, aramidic fibres, acrylic fibres; carbon, alumina, silicon carbide fibres, fiberglass, and so forth) can be used. The fibres can be used as chopped fibres, continuous fibres, fabrics, non woven fabrics and can be arranged in any of the well-known ways in the art.

The compositions according to the present invention allow thermosetting resins to be obtained with high mechanical properties, i.e., a bending modulus value which can range from 2,000 MPa to 4,500 MPa, a high impact strength value and a tensile deformation at break value higher than 1% and preferably higher than 1.5%. The HDT (Heat Distortion Temperature) of the resin is generally higher than 80° C. and preferably is higher than 120° C.

Preferred compositions according to the present invention are those in which the unsaturated resin of the (B) component is one of the following: vinyl ester resin, polyester resin having a terminal- hydroxy number comprised between 0 and 100 mg of KOH per gram of resin, a mixture of vinyl ester/polyester resins. Further compositions among the preferred ones are those in which the isocyanate is represented by polymeric MDI or modified MDI with a functionality comprised between 2and 3.

Compositions according to the invention which are also preferred are crosslinkable polymeric compositions in which the (E) trimerization catalyst comprises a compound selected from the group consisting of tertiary aliphatic and araliphatic polyamines, quaternary ammonium salts of carboxy acids, carboxylates of a metal of Groups I or II, carboxylates of a transition metal soluble in the composition, N,N'-dialkyl derivatives of glycine salified with alkaline metals, and their mixtures.

In order to illustrate the present invention, some examples are reported in the following, which however in no way shall be construed as being limitative of the same invention.

In all of following examples, the products obtained were characterized, after the compositions being crosslinked, by means of the following measurements carried out according to the following methods:

| | |
|---|---|
| MEB (modulus of elasticity in bending): | ASTM D 790 |
| MRB (modulus of rupture in bending): | ASTM D 790 |
| TM (tensile modulus): | ASTM D 638 |

| | |
|---|---|
| TS (tensile strength): | ASTM D 638 |
| Max. Ext. (extensibility): | ASTM D 638 |
| T_g (glass transition temperature) | DSC |
| Charpy impact (unnotched impact strength): | ASTM D 256 |

The moulding tests, both with pristine resin and with the fibre/resin reinforced composites, were carried out by means of a typical double-component S-RIM machine, manufactured by IMPIANTI OMS S.p.A., normally used with polyurethanes.

EXAMPLE 1

100 kg of SIRESTER IPN 002 (an unsaturated polyester resin containing 25% of styrene, having a specific gravity of 1.12 g/cm$^3$, with acidity number 2 and a viscosity at 25° C. of approximately 500 cP, produced by the company Sir Industriale) was charged to a stainless steel reactor. To this resin, 154 g of CO-IDROSSI TEN-CEM [basic Co(II) neodecanoate in solution of 21% by weight in plasticizer, manufactured by the company Mooney], 92.4 g of DABCO TMR-30 [2,4,6-tris(N,N-dimethylaminomethyl)phenol, produced by the company Air Products] and 154 g of CURITHANE 97 (a catalyst consisting of a mixture of glycols and amines, produced by the company Air Products) were added. After stirring, this blend [blend(I)] was charged to a first tank of the RIM injection machine. In an analogous way, the mixture (II) was prepared, which consists of 100 kg of DESMODUR 44V10F isocyanate (polymeric MDI with funcionality 2.7 and equivalent weight 133, specific gravity 1.23 g/cm$^3$, viscosity 130 cP at 25° C., produced by Bayer) and 4.285 kg of t-butyl perbenzoate. After stirring, the blend (II) was charged to the second tank of the RIM machine. The mound used was a planar mould of rectangular shape, of 40 cm×60 cm of size and 3 mm thick. The mould temperature was of 100° C. and the injection pressure was 150 bars at the nozzle. A ratio of blend (I) to blend (II) of 2:1 by weight was used. The sample was domoulded after 3 minutes. The mechanical properties of the pure (i.e., non-reinforced) resin and those of the resins reinforced with glass fibre or fabric are reported in following Table 1. In Table 2, a comparison is moreover reported between the values of modulus elasticity in bending, obtained from viscoelastic measurements with dynamic-mechanical analysis, carried out on a polyester resin and of the corresponding interpenetrated, polyester-based resin obtained according to the present example, with both said products being reinforced with fiberglass. The values of the modulus in bending are not meaningful in terms of absolute values, but supply an indication of the decrease in same modulus with increasing temperature; from Table 2, it clearly results that for the interpenetrated system according to the present invention, the collapse of the modulus of elasticity occurs at considerably higher temperatures then for a normal polyester.

TABLE 1

Mechanical properties of polyester-based interpenetrate (a)

| Property | Method | Pure resin | Fiberglass reinforced resin (b) | Glass cloth reinforced resin (c) |
|---|---|---|---|---|
| MRB | ASTM D790 | 110 MPa | 310 MPa | 500 MPa |
| MEB | ASTM D790 | 4100 MPa | 11200 MPa | 27000 MPa |
| TS | ASTM D638 | 65 MPa | 190 MPa | 350 MPa |
| TM | ASTM D638 | 3500 MPa | 13000 MPa | 25000 MPa |
| Max. Ext. | ASTM D638 | 1.5% | 1.9% | 1.9% |

TABLE 1-continued

Mechanical properties of polyester-based interpenetrate (a)

| Property | Method | Pure resin | Fiberglass reinforced resin (b) | Glass cloth reinforced resin (c) |
|---|---|---|---|---|
| T_g | | 120° C. | | |
| Charpy Impact | ASTM D256 | 6.5 kJ/m$^2$ | | |

(a) Resin according to Example 1, moulding cycle 3 minutes at 100° C.
(b) Composite sheet containing 45% by weight of UNIFILO U-750 (Vetrotex) fiberglass.
(c) Composite sheet containing 60% by weight of VR 181-P (Teximpianti) glass cloth.

TABLE 2

Comparison of the values of modulus of elasticity in bending of fiberglass reinforced materials (a)

| Temperature °C. | Polyester resin | Polyester-based interpenetrate composite plate |
|---|---|---|
| −40° C. | 14100 | 9700 |
| 0 | 13900 | 9350 |
| 23 | 13700 | 9100 |
| 80 | 11900 | 8700 |
| 130 | 5300 | 7750 |
| 180 | 3100 | 5600 |
| 220 | 2900 | 3800 |

(a) Resin according to Example 1, moulding cycle 3 minutes at 100° C., reinforced with 45% by weight of UNIFILO U-750 (Vetrotex) fiberglass.

EXAMPLE 2

100 kg of PACROSIR VE 196 (a vinyl ester resin containing 40% of styrene, having a specific gravity of 1.10 g/cm$^3$, with a number of acidity of 5 and a viscosity at 25° C. of approximately 70 cP, produced by the company Sir Industriale) was charged to a stainless steel reactor; to this resin, 154 g of CO-IDROSSI TEM-CEM, 154 g of CURITHANE 97 and 154 g of DABCO TMR 30 were added. After stirring, the system was charged to the first tank of the RIM injection machine. In an analogous way, the blend (II) was prepared which consists of 100 kg of DESMODUR 44V10F isocyanate and 4.285 kg of t-butyl perbenzoate. After stirring, the system was charged to the second tank of the RIM machine. The mould used and the operating conditions were the same as of Example 1. The mechanical properties of the pure resin and of the fiberglass or glass fabric reinforced resin are reported in following Table 3.

TABLE 3

Mechanical properties of vinylester-based interpenetrate (a)

| Property | Method | Pure resin | Fiberglass reinforced resin (b) | Glass cloth reinforced resin (c) |
|---|---|---|---|---|
| MRB | ASTM D790 | 120 MPa | 380 MPa | 580 MPa |
| MEB | ASTM D790 | 4000 MPa | 14000 MPa | 30000 MPa |
| TS | ASTM D638 | 70 MPa | 200 MPa | 360 MPa |
| TM | ASTM D638 | 3600 MPa | 13000 MPa | 26000 MPa |
| Max. Ext. | ASTM D638 | 1.6% | 1.6% | 1.6% |
| T_g | | 130° C. | | |
| Charpy Impact | ASTM D256 | 6.0 kJ/m$^2$ | | |

(a) Resin according to Example 2, moulding cycle 3 minutes at 100° C.

TABLE 3-continued

Mechanical properties of vinylester-based interpenetrate (a)

| Property | Method | Pure resin | Fiberglass reinforced resin (b) | Glass cloth reinforced resin (c) |
|---|---|---|---|---|

(b) Composite sheet containing 50% by weight of UNIFILO U-750 (Vetrotex) fiberglass.
(c) Composite sheet containing 60% by weight of VR 181-P (Teximpianti) glass cloth.

EXAMPLE 3

100 kg of SIRESTER IPN 002 was charged to a stainless steel reactor; to this resin, 154 g of CO-IDROSSI TEN-CEM, 154 g of CURITHANE 97 and 154 g of DABCO TMR 30 were added. After stirring, this blend [blend (I)] was charged to the first tank of the RIM injection machine. In an analogous way, the blend (II) was prepared which consists of 100 kg of DESMODUR 44V10F isocyanate, 4.285 kg of t-butyl perbenzoate and 3 kg of the additive EPOSIR 7106 (a monoepoxy derivative of straight alcohols produced by the company Sir Industriale). After stirring, the blend (II) was charged to the second tank of the RIM machine. The same mould as of Example 1 was used, with the following operating conditions being adopted: temperature 140° C., injection pressure at nozzle 150 bars, sample demoulding after 5 minutes. The mechanical properties of the pure resin and of the glass fabric reinforced resin are reported in following Table 4A.

TABLE 4A

Mechanical properties of polyester-based interpenetrate containing 3% of epoxy modifier (a)

| Property | Method | Pure resin (3% epoxy) | Glass cloth reinforced resin (b) |
|---|---|---|---|
| MRB | ASTM D790 | 90 MPa | 450 MPa |
| MEB | ASTM D790 | 4000 MPa | 25000 MPa |
| TS | ASTM D638 | 55 MPa | 320 MPa |
| TM | ASTM D638 | 3200 MPa | 23000 MPa |
| Max. Ext. | ASTM D638 | 1.8% | 1.9% |
| $T_g$ | | 203° C. | |
| Charpy Impact | ASTM D256 | 5.5 kJ/m$^2$ | |

(a) Resin according to Example 3, moulding cycle 5 minutes at 140° C.
(b) Composite sheet containing 60% by weight of VR 181-P (Teximpianti) glass cloth.

EXAMPLE 4

This test is carried out as in Example 3, but with the amount of the epoxy additive being reduced from 3 kg down to 1 kg. The mechanical properties of the resulting products are reported in following Table 4B.

TABLE 4B

Mechanical properties of polyester-based interpenetrate containing 1% of epoxy modifier (a)

| Property | Method | Pure resin (1% epoxy) | Glass cloth reinforced resin (b) |
|---|---|---|---|
| MRB | ASTM D790 | 110 MPa | 480 MPa |
| MEB | ASTM D790 | 4100 MPa | 27000 MPa |
| TS | ASTM D638 | 60 MPa | 360 MPa |
| TM | ASTM D638 | 3300 MPa | 26000 MPa |
| Max. Ext. | ASTM D638 | 3.3% | 1.8% |
| $T_g$ | | 197° C. | |
| Charpy Impact | ASTM D256 | 5.7 kJ/m$^2$ | |

(a) Resin according to Example 4, moulding cycle 5 minutes at 140° C.
(b) Composite sheet containing 60% by weight of VR 181-P (Teximpianti) glass cloth.

EXAMPLE 5

100 kg of SIRESTER IPN 002 was charged to a stainless steel reactor; to this resin, 3 kg of PRIOWAX 400 (a polyethylene glycol having a viscosity of 100 cP at 25° C., and a hydroxy number of 280, produced by the company Auschem), 154 g of CO-IDROSSI TEN-CEM, 154 g of CURITHANE 97 and 154 g of DABCO TMR 30 were added. After stirring, the blend was charged to the first tank of the RIM injection machine. In an analogous way, the blend (II) was prepared which consists of 100 kg of DESMODUR 44V10F isocyanate and 4.285 kg of t-butyl perbenzoate. After stirring, the blend was charged to the second tank of the RIM machine. The mould of Example 1 was used, with the operating conditions being the following: temperature 140° C., injection pressure at nozzle 150 bars, sample demoulding after 5 minutes. The mechanical properties of the pure resin and of the glass cloth reinforced resin are reported in following Table 5A.

TABLE 5A

Mechanical properties of polyester-based interpenetrate containing 3% of polyol (a)

| Property | Method | Pure resin (3% polyol) | Glass cloth reinforced resin (b) |
|---|---|---|---|
| MRB | ASTM D790 | 90 MPa | 520 MPa |
| MEB | ASTM D790 | 3400 MPa | 24000 MPa |
| TS | ASTM D638 | 60 MPa | 350 MPa |
| TM | ASTM D638 | 3000 MPa | 22800 MPa |
| Max. Ext. | ASTM D638 | 3.5% | 2.3% |
| $T_g$ | | 213° C. | |
| Charpy Impact | ASTM D256 | 6.1 kJ/m$^2$ | |

(a) Resin according to Example 5, moulding cycle 5 minutes at 140° C.
(b) Composite sheet containing 60% by weight of VR 181-P (Teximpianti) glass cloth.

EXAMPLE 6

The test is carried out as in Example 5, but with the amount of PRIOWAX 400 being decreased from 3 kg to 1 kg. The mechanical properties of the resulting products are reported in following Table 5B,

TABLE 5B

Mechanical properties of polyester-based interpenetrate containing 1% of polyol (a)

| Property | Method | Pure resin (1% polyol) | Glass cloth reinforced resin (b) |
|---|---|---|---|
| MRB | ASTM D790 | 100 MPa | 480 MPa |
| MEB | ASTM D790 | 3800 MPa | 24000 MPa |
| TS | ASTM D638 | 80 MPa | 360 MPa |
| TM | ASTM D638 | 3500 MPa | 23000 MPa |
| Max. Ext. | ASTM D638 | 2.0% | 2.0% |
| $T_g$ | | 221° C. | |
| Charpy Impact | ASTM D256 | 5.4 kJ/m² | |

(a) Resin according to Example 6, moulding cycle 5 minutes at 140° C.
(b) Composite sheet containing 60% by weight of VR 181-P (Teximpianti) glass cloth.

We claim:

1. Crosslinkable polymeric composition comprising the following components:

(A) an isocyanate having a functionality of at least 2 and not higher than 5, and a viscosity at 25° C. between 20 and 10,000 cP;

(B) an unsaturated polyester resin terminated with hydroxy groups and/or a vinyl ester resin terminated with hydroxy groups, containing vinylic or vinylidenic unsaturations, in a mixture with 10–60% by weight of a vinylic or divinylic monomer, wherein the (B) component is present in an amount of from 10 to 80% of the total weight of (A)+(B), and the resin contains hydroxy groups in an amount such that the resin has a terminal hydroxy number that is higher than 0 and up to 100 mg of KOH per gram of resin;

(C) a free-radical polymerization initiator stable at temperature lower than 70° C., in amounts between 0.1 and 4% by weight, based on the total weight of (A)+(B);

(D) a promoter for the decomposition of the (C) initiator at temperatures lower than 70° C., comprising: (i) a salt of a transition metal, soluble in the mixture constituted by (A) and (B), in an amount between 0.005 and 0.5% by weight, calculated on the metal, relative to the total weight of (A)+(B), or (ii) an N,N-dialkyl substituted aromatic amine in an amount of from 0.05 to 1% by weight, or (iii) a mixture of (i) and (ii); and (E) a catalyst for the trimerization of (A) isocyanate in an amount between 0.01 and 4% by weight, relative to the total weight of (A)+(B);

wherein the (B) component optionally comprises a polyol, said polyol being present in an amount of from 0 to 3% by weight of said unsaturated polyester resin and/or vinyl ester resin, said polyol having a minimum functionality of 2 and a maximum functionality of 7, and a minimum molecular weight of 200 and a maximum molecular weight of 10,000; wherein the total amount of polyol in said composition does not exceed 3% by weight of said unsaturated polyester resin and/or vinyl ester resin;

and wherein the molar ratio of the isocyanic groups of the (A) component to the total hydroxy groups in the crosslinkable polymeric composition is higher than 1.5.

2. Composition according to claim 1, in which the (A) isocyanate has a functionality between 2 and 4, and a viscosity between 40 and 1,000 cP at 25° C.

3. Composition according to claim 1, in which the (A) isocyanate is defined by the general formula

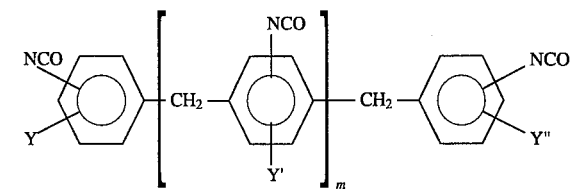

wherein Y, Y', Y", which are the same, or different from each other, are selected from the group consisting of H, Cl, Br, F, and $CH_3$, and m=an integer within the range of from 0 to 3.

4. Composition according to claim 1, in which the (C) polymerization initiator comprises a peroxy compound in an amount of from 0.5 to 3% by weight, based on total composition weight, selected from the group consisting of t-butyl perbenzoate, t-amyl perbenzoate, t-butyl peroxyacetate, di-n-butyl diperoxyphthalate, and their mixtures, the (D) promoter for the decomposition of (C) initiator comprising cobalt(II) neodecanoate in an amount between 0.02 and 0.3% by weight, based on total composition weight; the (E) catalyst of trimerisation comprising 2,4,6-tris(dimethylaminomethyl)phenol in amounts of from 0.01 to 0.6% by weight, based on total composition weight, and a mixture of glycol and amines in amounts of 0.01 to 0.6% by weight, based on total composition weight.

5. Composition according to claim 1, in which the (C) polymerization initiator comprises a peroxy compound in an amount of from 0.5 to 3% by weight, based on total composition weight, selected from the group consisting of t-butyl perbenzoate, t-amyl perbenzoate, t-butyl peroxyacetate, di-n-butyl diperoxyphthalate, and their mixtures; the (D) promoter for the decomposition of (C) initiator comprising cobalt(II) 2-ethylhexanoate in an amount between 0.01 and 0.03% by weight, based on total composition weight; the (E) catalyst of trimerisation comprising 2,4,6-tris(dimethylaminomethyl)phenol in amounts from 0.01 to 0.05% by weight, based on total composition weight, and a mixture of glycol and amines in amounts of from 0.01 to 0.5% by weight, based on total composition weight.

6. Composition according to claim 1, additionally comprising up to 10% by weight, relative to the total weight of components (A)+(B), of a modifier (F) capable of reacting with said (A) isocyanate in the presence of the catalyst (E), wherein said modifier is a mono or diepoxide derived from straight chain $C_4$–$C_{16}$ alcohols.

7. Composition according to claim 1, in which the polyol included in the (B) component has a functionality between 2 and 5.

8. Composition according to claim 1, in which the polyol included in the (B) component has a molecular weight between 300 and 5,000.

9. Composition according to claim 1, in which the polyol included in the (B) component comprises a mixture of a diol with a polyol having a functionality higher than 2.

10. Composition according to claim 1 in which the (A) isocyanate is in the form of a prepolymer with a polyol having a minimum functionality of 2 and a maximum functionality of 7; and a minimum molecular weight of 200 and a maximum molecular weight of 10,000.

11. Composition according to claim 1, in which the molar ratio NCO/OH of the isocyanic groups of the (A) component to the total hydroxy groups in the composition is between 2.5 and 6.

12. Composition according to claim 1 in which the free-radical polymerization initiator (D) is selected from the group consisting of t-butyl and t-amyl perbenzoate, t-butyl and t-amyl peracetate, dibutyl diperoxyphthalate and their mixtures.

13. Composition according to claim 1 in which the promoter for the decomposition of (E) catalyst is selected from cobalt salts or diethylaniline.

14. Composition according to claim 1 in which the (E) trimerisation catalyst comprises a compound selected from the group consisting of tertiary aliphatic and araliphatic polyamines, quaternary ammonium salts of carboxy acids, carboxylates of a metal of Groups I or II, carboxylates of a transition metal soluble in the composition, N,N'-dialkyl derivatives of glycine salified with alkaline metals, and their mixtures.

15. Composition according to claim 1, in which the polyol included in the (B) component is polypropyleneglycol, a polyesterpolyol or a polyetherester-polyol.

16. Composition according to claim 1 in which the (A) isocyanate is polymeric MDI or MDI modified with carbodiimide, and has a functionality between 2 and 3.

17. Process for preparing a composition according to claim 1 comprising adding a mixture of (B), (D) and (E) component to a mixture of (A) and (C) components.

* * * * *

UNITED STATES PATENT AND TRADEMARK OFFICE
CERTIFICATE OF CORRECTION

PATENT NO. : 5,596,021
DATED : January 21, 1997
INVENTOR(S) : Andrea Adembri et al.

It is certified that error appears in the above-indentified patent and that said Letters Patent is hereby corrected as shown below:

Column 13, Line 50: Delete "4%"   Insert --1%--

Signed and Sealed this

Twenty-ninth Day of April, 1997

Attest:

BRUCE LEHMAN

Attesting Officer

Commissioner of Patents and Trademarks